UNITED STATES PATENT OFFICE.

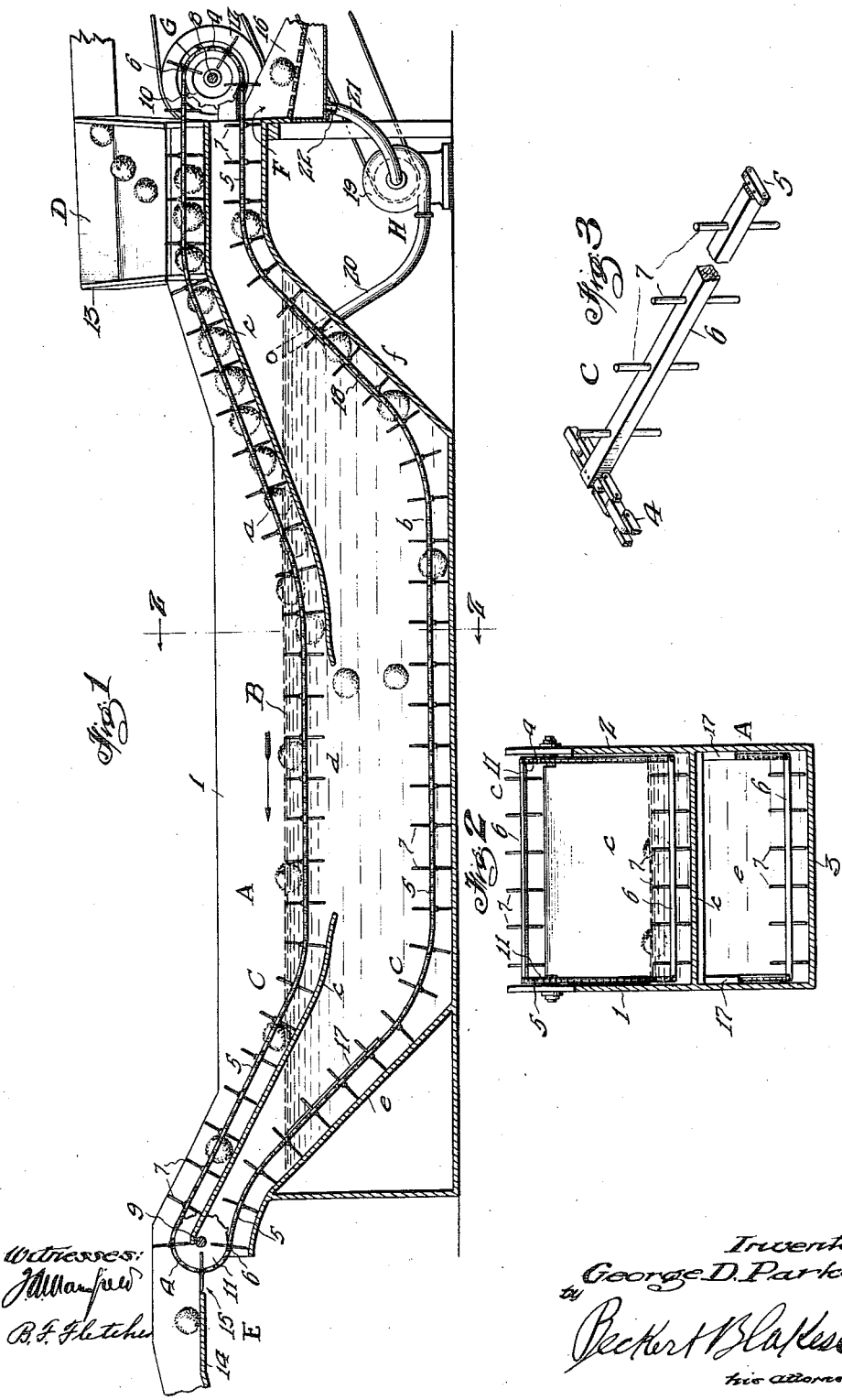

GEORGE D. PARKER, OF RIVERSIDE, CALIFORNIA.

FRUIT-SEPARATOR.

994,654.  Specification of Letters Patent.  Patented June 6, 1911.

Application filed February 23, 1910, Serial No. 545,346. Renewed March 18, 1911. Serial No. 615,384.

*To all whom it may concern:*

Be it known that I, GEORGE D. PARKER, a citizen of the United States, residing at Riverside, in the county of Riverside and State of California, have invented new and useful Improvements in Fruit-Separators, of which the following is a specification.

This invention relates to fruit separators, and more particularly to separating means for dividing from a given quantity or supply of fruit those which have been rendered unsound by frost-touch, freezing or other impairment by the elements; and the invention has for its object to provide means, apparatus or mechanism to which both the sound and unsound or perfect and imperfect fruit may be fed, within which or through the agency of which unsound or imperfect fruit may be separated from the sound or perfect fruit, and from which the sound or perfect and unsound or imperfect fruit may be separately removed or withdrawn.

Particular objects of the invention consist in the provision of means, apparatus or mechanism, having the functions and offices stated which will be relatively simple and inexpensive in organization and construction, positive in operation, compact in form and generally superior in point of efficiency and serviceability with respect to any means at present utilized to obtain the objects and ends at the accomplishment of which the invention is directed.

The invention is shown in the accompanying drawing in one form of embodiment, and is hereinafter described and finally pointed out in claims.

In the drawing:—Figure 1 is a longitudinal vertical sectional view, partly in full lines for clearness of illustration, of fruit separating means constructed and organized according to the invention; Fig. 2 is a vertical transverse sectional view of the same taken upon the line 2—2, Fig. 1, and looking in the direction of the appended arrows; and, Fig. 3 is a fragmentary isometric view, of a portion of fruit actuating means shown in the other figures, the same being upon an enlarged scale and partly broken away for clearness of illustration.

Corresponding parts in all the figures are denoted by the same reference characters.

Referring with particularity to the drawing, the fruit separating means constituting the invention is shown therein as embodied in the construction and organization comprising a receptacle or tank A which is charged or supplied with a medium B the specific gravity of which is mathematically related to that of both sound and perfect or unsound and imperfect fruit; and fruit actuating or distributing means C whereby the fruit is conducted through and withdrawn from the receptacle or tank A, being introduced thereto at or by feed or supply means D and withdrawn therefrom at or by discharge means E and F respectively.

G designates operating means for the fruit actuating or distributing means C; and H designates pumping means for supplying medium B to the receptacle or tank A, said pumping means being actuated by the operating means G or the prime mover thereof.

The fruit actuating or distributing means C preferably comprise two members, $a$ and $b$ respectively, which members traverse courses within and through the receptacle or tank A which extend at different levels within the latter. The upper member $a$ of the fruit actuating or distributing means C preferably traverses a course in part above and defined by a chute or way $c$ which latter is severed or cut away or interrupted in its continuity substantially midway of the length of the same and of the receptacle or tank A, providing an opening $d$ which the member $a$ traverses in the clear. The opposite end portions of the receptacle or tank A are also respectively provided with chutes or ways, $e$ and $f$ respectively, which define the course of the lower member $b$ downward into the receptacle or tank and upward out of the same. The opposite portions of the chute or way $c$ are inclined substantially in correspondence with the inclination of the respective chutes or ways $e$ and $f$ above which and spaced from which they are respectively disposed.

A particular provision, construction, combination, association and relative arrangement of parts, members and features embodying the invention in one specific organization thereof is as follows: The receptacle or tank A is provided with side walls 1 and 2 and a bottom wall 3. The chutes $e$ and $f$ and the members of the chute $c$ extend continuously between the side members 1 and 2 inwardly of the tank from the ends thereof, and the chutes $e$ and $f$ may constitute the ends of the tank. The medium B which is mathematically related in specific gravity to the specific gravity of both sound or perfect and unsound or imperfect fruit is preferably liquid in character and of a specific gravity higher than unsound or imperfect fruit and lower than sound or perfect fruit, and alcoholic spirits are found to properly and satisfactorily embody such specific gravity values or relatives values. The fruit actuating or distributing means C may consist of an endless conveyer comprising two spaced link belts, 4 and 5 respectively, which are connected by transverse bars 6 spaced apart sufficiently to permit the accommodation and passage of fruit between adjacent bars, each of said bars being provided with a plurality of spaced transversely and preferably vertically disposed pins or fingers 7. The link belts 4 and 5 which constitute sprocket chains are trained about shafts 8 and 9 journaled transversely of the receptacle A at the opposite ends thereof and provided with sprocket wheels 10 and 11 fixed to the respective shafts 8 and 9. The shaft 8 may be provided with a belt and pulley drive 12 constituting the operating means G. The feed or supply means D may comprise a chute or hopper 13 arranged adjacent to the operating means G at one end of the receptacle A and superposed with relation to the adjacent end portion of the chute or way $c$, and whereby fruit is led directly to the fruit actuating or distributing means C at the point where a given portion thereof commences to traverse the upper level of the course of motion thereof, as the member $a$ of the means C, the direction of motion being indicated by the arrow in Fig. 1 adjacent to said member $a$. The discharge means E comprises a trough 14 one end portion of which embraces the sprocket wheels 11 at the end of the receptacle A opposite to that at which the sprocket wheels 10 are located, and being cut away as at 15 to permit play of the bars 6 and pins or fingers 7 through the same; the other end of the trough 14 leading to a point of discharge or distribution of the unsound or imperfect fruit. The discharge means E is located at the upper end of the adjacent portion of the chute or way $c$ which is last traversed by the member $a$ of the means C. The discharge means F comprises a trough 16 disposed at the upper end of the chute or way $f$ which is last traversed by the member $b$ of the actuating or distributing means C, and by which the fruit is conducted to a point of distribution or deposit. From the above it will be noted that the troughs 14 and 16 are respectively arranged at the proper points to receive the fruit withdrawn from the tank by the upper member $a$ of the means C and the fruit withdrawn from the tank by the lower member $b$ of the means C.

The side members 1 and 2 of the tank are preferably provided with pairs of spaced cleats, 17 and 18 respectively, the pairs 17 being arranged to confine the ends of the bars 6 to a proper path of movement above the chute or way $e$, and the pair 18 being arranged to confine the end portions of said bars 6 to a proper path of movement above the chute or way $f$.

The pumping means H may comprise a pump 19 of any preferred type or organization and capable of forcing into the tank A a suitable charge or supply of the medium B, through a supply pipe 20; and a drain pipe 21 may lead to the pump 19 from an opening 22 in the trough 16 of the discharge means F, whereby any of the medium B carried over into the trough 16 may be returned to the tank.

The operation, method of use and advantages of the fruit separator constituting the invention will be readily understood from the foregoing description taken in connection with the accompanying drawing and the following statement: The fruit which is to be divided or separated into sound or perfect and unsound or imperfect units is fed to the apparatus or mechanism comprising the receptacle A and the actuating or distributing means C and the adjuncts thereof, through the feed or supply means D and the chute or hopper 13 thereof, the link belts or sprocket chains 4 and 5, together with the cross-bars 6 connecting the same and the pins or fingers 17 carried thereby, being operated in the direction indicated by the adjacent arrow in Fig. 1, through the agency of the operating means G. The said actuating means C are so disposed within and in connection with the receptacle A as to embrace or comprise two members, an upper member $a$ and a lower member $b$, which travel in generally superposed courses throughout the length of the receptacle A, the member $a$ traveling an upper course or level, and the member $b$ traveling a lower course or level, and the receptacle A being charged with the medium B to such level as will permit both members of the means C to traverse or pass through the body thereof, in part or in whole, and at least be so immersed in or disposed within the body of such medium at such portions of the members $a$ and $b$ as are respectively above and below the opening $d$ in the chute $c$. The upper member $a$ first traverses the downwardly inclined portion of the chute $c$, then the opening $d$, and then the upwardly inclined portion of the chute $c$. The lower member $b$ first traverses the downwardly inclined chute $e$, then the bottom of the receptacle A, and then the upwardly inclined chute $f$. The discharge means E and F are located between the members $a$ and $b$; the members $a$ conveying to the discharge means E the unsound or imperfect fruit, and the members $b$ conveying to the discharge means F the sound or perfect fruit. The sound or perfect fruit is separated from the unsound or imperfect fruit in accordance with the specific gravity values of both classes or grades of fruit and of the medium B. I have found in practice that unsound fruit, such as oranges that have been frost-touched or frozen, while exteriorly are of perfect appearance, will rise to the surface of the body of the medium B, such as alcoholic spirits, while the sound or perfect fruit will sink to the lower portion of the mass of such medium B. Therefore, as the fruit of both grades is carried by the means C from the hopper 13 along the downwardly inclined portion of the chute c and across the opening d, the unsound fruit will remain adjacent to the level of the medium B, and the sound fruit will drop to the bottom of the receptacle and of said medium body. The unsound fruit is carried by the member a across the opening d and up the inclined chute e to the discharge trough 14; and the sound fruit is engaged by the member b at the lower portion of the receptacle and is carried up the inclined chute f and conveyed to the discharge trough 16. In this manner, a continuous operation of the actuating or distributing means C, and continuous supply of fruit at the feed hopper 13, results in a continuous discharge of the unsound or imperfect fruit from the discharge trough 14, and the continuous discharge of the sound or perfect fruit from the discharge trough 16. The bars 16, while spaced apart sufficiently to permit the sound fruit to pass between the same, at the upper member a, to the bottom of the receptacle, nevertheless effectively actuate and convey the fruit to the respective discharge troughs in which function they are assisted by the pins or fingers 7.

The pump 19 returns to the receptacle any of the liquid medium carried over into the trough 16 with the sound fruit, and serves also to charge the receptacle from a suitable source of supply.

By the utilization of the invention I am enabled to successfully, practically and speedily separate unsound or imperfect from sound or perfect fruit, in a positive and unfailing manner, and without injury to the fruit, as the medium B employed may be conveniently removed from the oranges by rinsing or drying, such medium readily evaporating when alcoholic in nature. The output of the machine, constituting the sound or perfect fruit, may be relied upon to contain no unsound or imperfect culls, and therefore commands a higher market price than fruit separated by any of the haphazard methods heretofore employed and based chiefly upon guess-work.

I do not desire to be understood as limiting myself to the specific provision, construction, organization, combination and association of parts, members and features shown and described, as embodying the invention; but reserve the right to vary the same, in adapting the invention to varying conditions of use, without departing from the spirit of the invention and the terms of the following claims.

Having thus described my invention, I claim and desire to secure by Letters Patent:

1. A receptacle adapted to contain a medium of predetermined specific gravity, an endless conveyer disposed within said receptacle in position to travel different superposed levels of the medium therein, a chute or way disposed beneath the upper level traversed by said conveyer and provided with an unobstructed opening, and separate discharge means disposed adjacent to the opposite ends of said levels traversed by said conveyer; said conveyer comprising spaced members connected by spaced cross-bars each of which is provided with spaced fingers.

2. A receptacle, an endless conveyer disposed for travel in different courses or at superposed levels through said receptacle and a medium therein, a chute disposed beneath the upper course of said conveyer and having oppositely inclined end portions separated by an opening, oppositely inclined chutes disposed beneath the lower course of said conveyer, and separate discharge means disposed respectively adjacent to opposite ends of the upper course and the lower course of said conveyer.

3. A receptacle adapted to contain a medium of predetermined specific gravity, means for withdrawing fruit from said receptacle and from different levels of the medium therein, and a chute or way disposed beneath the means for withdrawing fruit from an upper level of said medium and provided with an opening intermediate of the ends of the chute or way.

In testimony whereof, I have signed my name to this specification in the presence of two subscribing witnesses.

GEORGE D. PARKER.

Witnesses:
RAYMOND I. BLAKESLEE,
CAL. F. HUNTER.